Figures 1, 2:
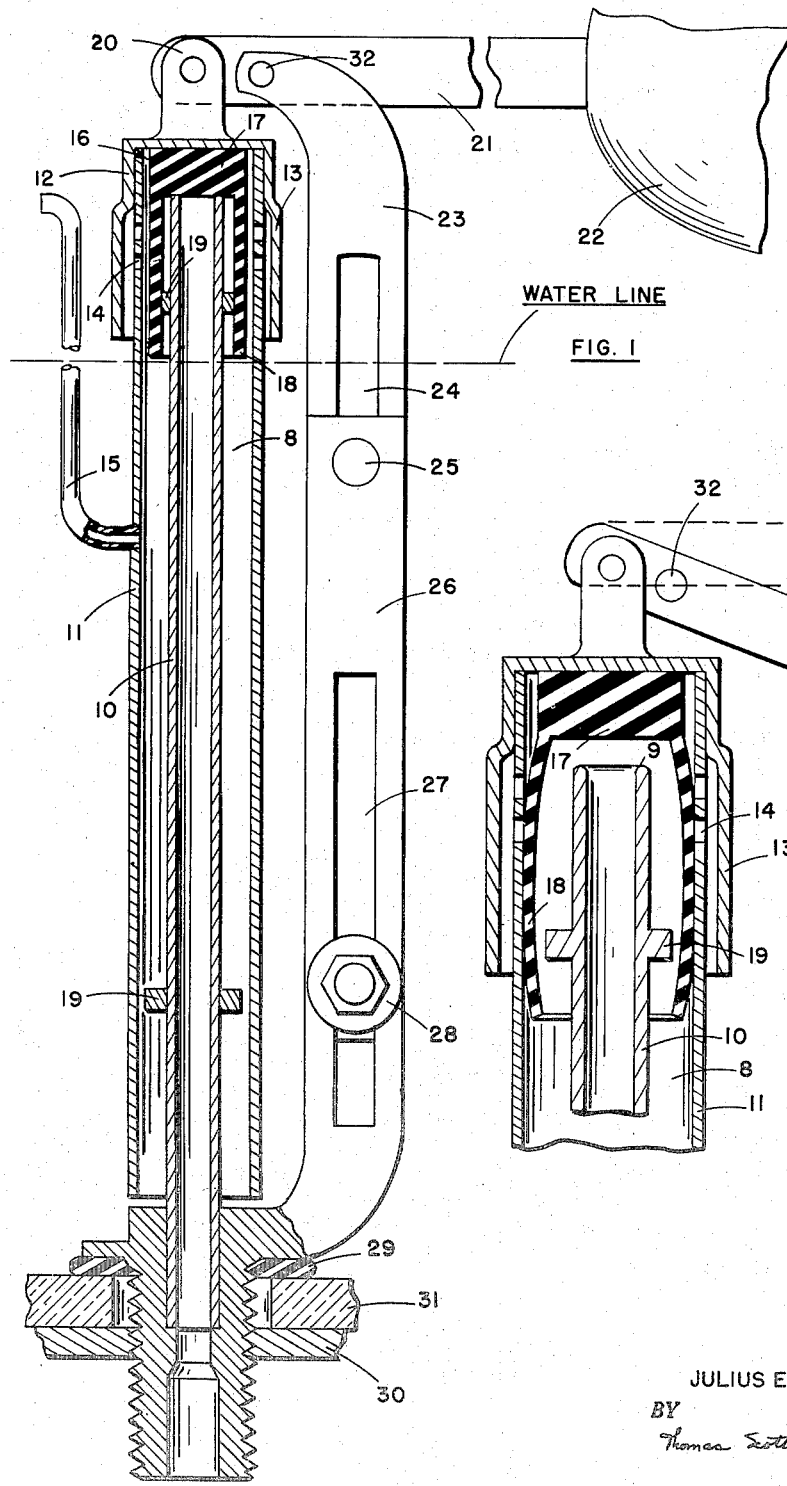

Jan. 20, 1959 J. E. PERSON 2,869,572
BALL COCK VALVE WITH FLOATING, INVERTED CUP, SEALING MEMBER
Filed July 28, 1955

INVENTOR.
JULIUS E. PERSON
BY
Thomas Scott MacDonald

ATTORNEY

United States Patent Office 2,869,572
Patented Jan. 20, 1959

2,869,572

BALL COCK VALVE WITH FLOATING, INVERTED CUP, SEALING MEMBER

Julius E. Person, Garden Grove, Calif.

Application July 28, 1955, Serial No. 524,860

3 Claims. (Cl. 137—218)

This invention is directed to a new and improved ball cock valve for water closet or flush tanks. More particularly, the invention concerns a floating cup member adapted to seal a water inlet tube in one position, to control the flow of water into the main flush tank after the tank has been emptied and to insure a positive anti-siphon action in the valve.

Heretofore, various types of ball cock valves have been proposed. The great majority of such valves are of complex construction and suffer from severe corrosion problems due to metal-to-metal sliding contacts therein. The present invention overcomes many of the difficulties of prior art constructions by providing a simple structure having no metal-to-metal contacts as corrosion sources and, in addition, provides a non-spurting or dripping, relatively noiseless device having an anti-siphon feature with auxiliary sealing means.

An object of this invention is to provide a ball cock valve having a positive sealing action.

A further object of this invention is to provide a sealing means for a ball cock valve operable during all operations of the valve.

A still further object of this invention is to provide a non-corrodible, relatively noiseless ball cock valve.

An additional object of this invention is to provide a valve device having an integral resilient member having various sealing functions.

The above objects, as well as other objects of this invention will be apparent from the following description of the drawing in which Fig. 1 is a partial cross-sectional view of the overall ball cock valves; and Fig. 2 illustrates valve operation when liquid is flowing in through the inlet conduit.

The Fig. 1 ball cock assembly basically comprises a central water inlet conduit 10 having an inlet orifice 9, a filler pipe 11 concentrically around and spaced from the conduit 10, means, illustrated as a cap member 12 with a depending anti-splash guard 13, sealing the upper end of the pipe 11, and an inverted, resilient, elastomeric cup 16 between the conduit 10 and pipe 11. The inverted cup 16 has a portion 17 between the end closure means 12 of pipe 11 and the orifice 9 of conduit 10, and a second portion consisting of an integral depending skirt 18 freely extending in the space between the outer periphery of the conduit 10 and the inner periphery of pipe 11. Apertures 14 are provided in the upper part of p.pe 11 situated above the bottom or free edge of the skirt 18 in any position of the pipe 11 or cup 16. Such apertures 14 function to allow entry of air into the central part of the valve to prevent siphoning of water into the main water supply. Restriction means or embossments 19 are formed integrally with or attached to the outer periphery of inlet conduit 10 to provide a pressure within the space 8 between conduit 10 and pipe 11 which controls flow of water downward through space 8 into a water closet tank. Numeral 31 denotes a bottom section of such tank. Means 19 also builds up sufficient pressure in space 8 to force water through a tube 15 to refill the water closet trap through the closet overflow (not shown). The refill tube 15 is preferably made of plastic to insure utmost flexibility and useful life.

A lug 20 is made integrally with or attached to the cup member 12 for the reception of one end of a float lever 21. A float 22 is provided, as is conventional, on the opposite end of lever 21. An arm 23, having a top pivot point 32, in conjunction with a member 26, supports the lever 21 on the water closet tank bottom 31. A conventional washer 29 and nut 30 combination secures member 26 to the tank bottom. Adjusting means 24, 25 and 27, 28, consisting of slots and bolts, as illustrated, provide a means of installing the present ball cock in water closets of various sizes.

Operation of the device is normal operation as seen in both Fig. 1 and Fig. 2. When the water closet is filled with water, the level is as illustrated in Fig. 1. The action of float 22 creates a downward force on capped pipe 11 which positively forces the flat portion 17 of the inverted cup 16 into sealing relationship with the orifice 9. If a vacuum should occur in conduit 10, the disc sealing portion 17 would be further forced down on the orifice 9 and in addition the depending skirt portion 18 will seal around the conduit 10 at the upper restriction means 19. Along with this dual mechanical seal, air may enter through apertures 14 into the space 8 to break the vacuum within conduit 10 in case of ineffectual sealing. When the flush valve (not shown) of the water closet is tripped, the water level immediately drops along with the float 22. Pipe 11 and its cap 12 rise and are no longer in positive engagement with cup 16. Cup 16 is then freely floating in the space between cap 12 and conduit 10. As the pressure is released on the cup 16, water begins to rush out of conduit 10, is redirected by the portion 17 and passes into space 8 through the gap between upper restriction 19 and the inner periphery of the skirt 18. A positive movement of the skirt portion 18 against the inner periphery of the pipe 11 and into sealing relationship therewith below the apertures 14 is effected by the force of water. This prevents any emission of water through the apertures 14 and contributes to the lack of splashing and noiselessness of the present device.

As can be seen from the above-described construction, a ball cock valve is provided having no metal parts in sliding contact and having positive seals in all conditions of operation.

Although the invention has been described and illustrated in in detatil, it is to be clearly understood that the same is by way of illustration and example only and is not to be taken by way of limitation, the spirit and scope of this invention being limited only by the terms of the appended claims.

I claim:

1. A ball cock valve comprising an open-ended water inlet conduit, restriction means on the periphery of said conduit, a filler pipe concentrically around said conduit and spaced from said restriction means, a cap portion fixed on said pipe extending above the open end of said conduit, a free floating elastomeric, inverted cup member between said conduit and said cap portion and having a skirt depending between said pipe and said restriction, and float controlled means connected to said cap portion, said cap portion adapted to exert force on said cup member for sealing said cup member on said conduit.

2. The invention as set out in claim 1 in which vacuum breaking apertures are provided in said filler pipe, said apertures being juxtaposed opposite an intermediate portion of said depending skirt.

3. The invention as set out in claim 1 wherein the free floating, inverted cup member has a flat surface for sealing on the open end of said conduit and a substantially coextensive, parallel flat surface for operative contact by said cap portion.

References Cited in the file of this patent

UNITED STATES PATENTS

| | | |
|---|---|---|
| 1,257,231 | Hill | Feb. 19, 1918 |
| 1,649,620 | Siefen | Nov. 15, 1927 |
| 2,284,051 | Gilbert | May 26, 1942 |
| 2,294,785 | Langdon | Sept. 1, 1942 |
| 2,367,951 | Lewis | Jan. 23, 1945 |
| 2,395,906 | Owens | Mar. 5, 1946 |
| 2,607,364 | Smith | Aug. 19, 1952 |
| 2,681,662 | Smith | June 22, 1954 |
| 2,707,969 | Langdon | May 10, 1955 |
| 2,746,477 | Krause | May 22, 1956 |